(12) United States Patent
Falconer et al.

(10) Patent No.: US 9,373,306 B2
(45) Date of Patent: Jun. 21, 2016

(54) DIRECT VIEWER PROJECTION

(71) Applicant: INTEL CORPORATION, Santa Clara, CA (US)

(72) Inventors: Maynard C. Falconer, Portland, OR (US); Nathan R. Andrysco, Chandler, AZ (US)

(73) Assignee: Intel Coporation, Santa Clara, CA (US)

( * ) Notice: Subject to any disclaimer, the term of this patent is extended or adjusted under 35 U.S.C. 154(b) by 143 days.

(21) Appl. No.: 14/224,669

(22) Filed: Mar. 25, 2014

(65) Prior Publication Data

US 2015/0279321 A1    Oct. 1, 2015

(51) Int. Cl.
*G09G 5/10* (2006.01)
*G09G 3/20* (2006.01)
*G09G 3/06* (2006.01)
*G09G 3/36* (2006.01)
*G06T 11/00* (2006.01)
*G09F 9/00* (2006.01)
*G02F 1/13* (2006.01)
*H05B 33/00* (2006.01)

(52) U.S. Cl.
CPC .......... *G09G 5/10* (2013.01); *G09G 2320/0233* (2013.01); *G09G 2320/0646* (2013.01); *G09G 2320/0653* (2013.01)

(58) Field of Classification Search
CPC combination set(s) only.
See application file for complete search history.

(56) References Cited

U.S. PATENT DOCUMENTS

| 6,433,907 | B1 | 8/2002 | Lippert et al. | |
| 7,365,892 | B2 | 4/2008 | Sprague et al. | |
| 2005/0248524 | A1* | 11/2005 | Feng | G09G 3/3413 345/102 |
| 2008/0192065 | A1* | 8/2008 | Selbrede | G09G 3/3413 345/589 |
| 2010/0103089 | A1* | 4/2010 | Yoshida | G09G 3/2022 345/102 |
| 2011/0032365 | A1* | 2/2011 | Yett | G02B 27/2235 348/207.1 |
| 2011/0149012 | A1* | 6/2011 | Bolle | H04N 7/144 348/14.08 |
| 2011/0157471 | A1* | 6/2011 | Seshadri | G06F 3/14 348/564 |
| 2012/0169777 | A1* | 7/2012 | Budni | G09G 3/02 345/690 |
| 2012/0249973 | A1* | 10/2012 | Miura | G02B 27/0905 353/38 |
| 2015/0253487 | A1* | 9/2015 | Nichol | G02B 6/0036 362/610 |
| 2015/0268399 | A1* | 9/2015 | Futterer | G02B 6/005 315/151 |
| 2015/0268479 | A1* | 9/2015 | Woodgate | G02B 27/2214 349/15 |

OTHER PUBLICATIONS

"Microvision: Technology," Technology Solutions, 1996-2013, 1 page.
"Microvision: PicoP Display Engine," Technology Solutions, 1996-2013, 3 pages.
"SHOWWX—The World is Your Canvas" MicroVision, Inc., 2010, 2 pages.

(Continued)

*Primary Examiner* — Wesner Sajous
(74) *Attorney, Agent, or Firm* — Finch & Maloney PLLC

(57) ABSTRACT

Techniques are disclosed for direct viewer projection, which involves having each pixel's emitted light aimed at or otherwise provided directly to the target pupil of a viewing person. In one embodiment, the techniques are implemented using steerable, collimated light sources fashioned into an array to effectively provide a display screen. Each steerable, collimated light source of the array corresponds to one pixel of a given image at a given viewing location, such that no one light source shows a whole image; rather, the whole array is used to display an image. The array can be scanned to provide different images to different viewing locations. The content projected to the different locations may be related (e.g., a movie) or unrelated (e.g., two different movies). A specific viewer can be identified and tracked such that the content is only projected to the target viewer's eyes and no one else's.

25 Claims, 9 Drawing Sheets

(56) References Cited

OTHER PUBLICATIONS

Newman, "what happened to glasses-free 3d tv?", Retrieved from http://techland.time.com/2013/01/16/what-happened-to-glasses-free-3d-tv/ on Jun. 25, 2014, Jan. 16, 2013, pp. 1-3.

Kerr, "HP creating glasses-free 3D tech for smartphones, tablets", Retrieved from http://www.cnet.com/news/hp-creating-glasses-free-3d-tech-for-smartphones-tablets/ on Jul. 3, 2014, Mar. 20, 2013, pp. 1-4.

Goss, "3D with glasses is dead and 4K won't sell, says HBO tech chief", Retrieved from http://www.techradar.com/news/television/3d-with-glasses-is-dead-and-4k-won-t-sell-says-hbo-tech-chief-1139576 on Jul. 3, 2014, Mar. 21, 2013, pp. 1-5.

Swider, "Decreasing the need for 3D glasses, increasing the viewing angle.", Retrieved from http://www.techradar.com/reviews/gadgets/hisense-glasses-free-3d-prototype-1123795/review on Jul. 3, 2014, Jan. 9, 2013, pp. 1-5.

"Intel Survey Finds "Outlet Outrage" and "Peeping-Techs" Are New Travel Norms", Retrieved from http://newsroom.intel.com/community/intel_newsroom/blog/2012/06/20/intel-survey-finds-outlet-outrage-and-peeping-techs-are-new-travel-norms on Jun. 25, 2014, Jun 20, 2012, pp. 1-3.

Johnny Chung Lee, "Hacking the Nintendo Wii Remote", IEEE, Pervasive Computing, Jul.-Sep. 2008, pp. 39-45.

* cited by examiner

Image B projected to Viewing Location B

Image A projected to Viewing Location A

DIRECT VIEWER PROJECTION

BACKGROUND

In traditional projection technologies such as liquid crystal display (LCD), cathode ray tube (CRT), and plasma monitors, each pixel of the display is designed to emit light uniformly across the specified viewing region. Similarly, for rear projection theater-style systems, each pixel of the projector is designed to scatter light off the screen uniformly across the specified viewing region. There are many advantages to such traditional projection technologies, among them being that technological complexity is low and there is no need to know the viewer's position beyond the fact they are assumed to be in the viewing region. Also, one image is used for many viewers and there is no need for special viewing apparatuses (with exceptions like 3D glasses). Alternatives to three-dimensional (3D) projection include lenticular and holographic approaches, but only with varying degrees of success.

BRIEF DESCRIPTION OF THE DRAWINGS

FIG. 3a illustrates a direct view display system configured to provide images A and B to viewing locations A and B, respectively, in accordance with an embodiment of the present disclosure.

DETAILED DESCRIPTION

Figure 1:
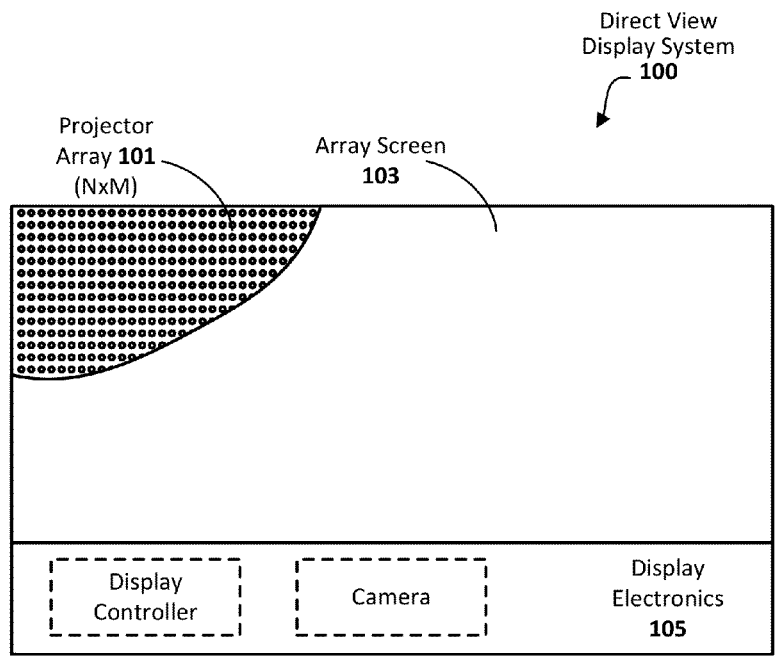
FIG. 1 illustrates a direct view display system configured in accordance with an embodiment of the present disclosure.

Techniques are disclosed for direct viewer projection, which differs from the traditional solutions by having each pixel's emitted light aimed at or otherwise provided directly to the target pupil of a viewing person. In one example embodiment, the techniques can be implemented using steerable, collimated light sources that are fashioned into an array to effectively provide a display screen. With such an array, the display screen can be used as a virtual viewing window where the image seen within that window changes with the viewer's position relative to the screen (3D or non-3D or both). Each steerable, collimated light source of the array corresponds to one pixel of a given image at a given viewing location, such that no one light source shows a whole image; rather, the whole array is used to display an image. The array can be scanned to provide different images to different viewing locations. So, for instance, while each viewer can generally be viewing the same display screen, the location of each viewer relative to that screen will cause each viewer's view to be at least somewhat unique. The content projected to the different locations may be related (e.g., a movie) or unrelated (e.g., two different movies or different advertisements). Further note that viewing privacy is provided, such that only the person at a given viewing location can see the content projected to that location. In some embodiments, a specific viewer can be identified (e.g., facial recognition) and tracked (e.g., eye tracking) such that the image content is only projected to the target viewer's eyes and no one else's.

General Overview

As previously explained, typical projection technologies provide a number of benefits, but also suffer from disadvantages as well, depending on the application. With respect to privacy, for instance, any viewer in the viewing area can generally see what is being displayed on screen (e.g., consider an airplane setting or a low wall work area where screen privacy maybe a concern). Also, 3D projection typically requires 3D glasses. In addition, such projection technologies are incapable of selectively providing content, which can result in wasted optical energy in some applications. In addition, each viewer and every eye within a given viewing area sees the same image with the same perspective. For purposes of contrast, this is unlike a traditional house window where each user looking out that window sees a different image unique to their location.

Thus, and in accordance with an embodiment of the present disclosure, a direct viewer projection system is provided, where images can be transmitted directly to a unique viewing location or even a particular viewer or pupil. Such direct viewer projection differs from traditional solutions by having each pixel's emitted light intentionally aimed directly at or otherwise provided directly to the pupil of a viewing person. The system can be implemented, for example, using steerable, collimated light sources that are fashioned into an array to effectively provide a display screen. With such an array, the display screen can be used as a virtual viewing window where the image seen within that window changes with the viewer's position relative to the screen (3D or non-3D or both). In particular, the array projects a plurality of unique image sets, each image set being projected to a corresponding location in the viewing area. Each steerable, collimated light source of the array corresponds to one pixel of a given image, such that no one light source shows a whole image; rather, the whole array is used to display an image.

In some example scenarios where the image sets are related (e.g., a movie), the image set projected to any one viewing location accounts for the perspective of that location relative to the screen (much like the way a person's view of the outdoors through a window changes as that person changes positions within the room). So, for instance, while each viewer can generally be viewing the same movie on the display screen, the location of each viewer relative to that screen will cause each viewer's view to be at least somewhat unique (e.g., people located on the right-side of the viewing area will have a view that includes a wall in the foreground with no area behind the wall being visible to those people, while people on left-side of the room will have a view that includes at least some of the area behind the wall). In other example scenarios, the image sets projected to different viewing locations need not be related (e.g., two different movies or different advertisements). Further note that viewing privacy is provided. For instance, in one embodiment, only the viewer at a specific given location can see the image content projected to that location while others at different locations see nothing or an alternative image. In another embodiment, a specific viewer can be identified (e.g., facial recognition) and tracked (e.g., eye tracking) such that the image content is only projected to the target viewer's eyes and no one else's.

So, and as will be appreciated in light of this disclosure, the techniques can be used to enable the projection of unique images to every set of pupils in the viewing region for multiple use cases, including two-dimensional (2D) viewing and glasses-free 3D viewing, as well as scenarios where there is no knowledge of viewers' position or eye location. Custom electronic displays or signage are thus enabled where multiple viewers in the viewing area are viewing the same display/sign at the same time, but each viewer sees a different image, advertisement, language, or any other content-tailored to the individual viewers and/or specific locations within the viewing area. For instance, one viewer standing in one section of the viewing area may see an advertisement for a brand of skateboards while another viewer standing in another section of the viewing area sees an advertisement for a particular automobile. As will be further appreciated in light of this disclosure, in some example scenarios (e.g., where a specific viewer and/or viewing location is identified), optical energy can be emitted only in the direction of the viewer's pupils, thus potentially reducing power consumption of the display. Lower power consumption is particularly helpful for mobile display devices that are power constrained (e.g., solar and/or battery powered).

An image set as used herein may include one or more images or so-called frames that is provided to one or more viewing locations, and may depict motion or a still scene, or a combination where some portions of a given frame include changes from the previous frame (so as to show motion or other dynamic imagery) and other portions of that frame remain constant. A viewing area generally refers to an area that receives one or more image sets, and may include multiple known discrete viewing locations so as to provide a grid-based viewing area. Each viewing location within the grid can receive a unique image set, although in other example cases multiple viewing locations within the grid may receive the same image set (e.g., all locations on left half of theatre receives one image set, and all locations on right half of theatre receives another image set). In such a grid-based viewing area, note that knowledge of the location of any one user is unnecessary, particularly in the case where the distance between each viewing location is relatively small.

System Architecture

Figure 2:
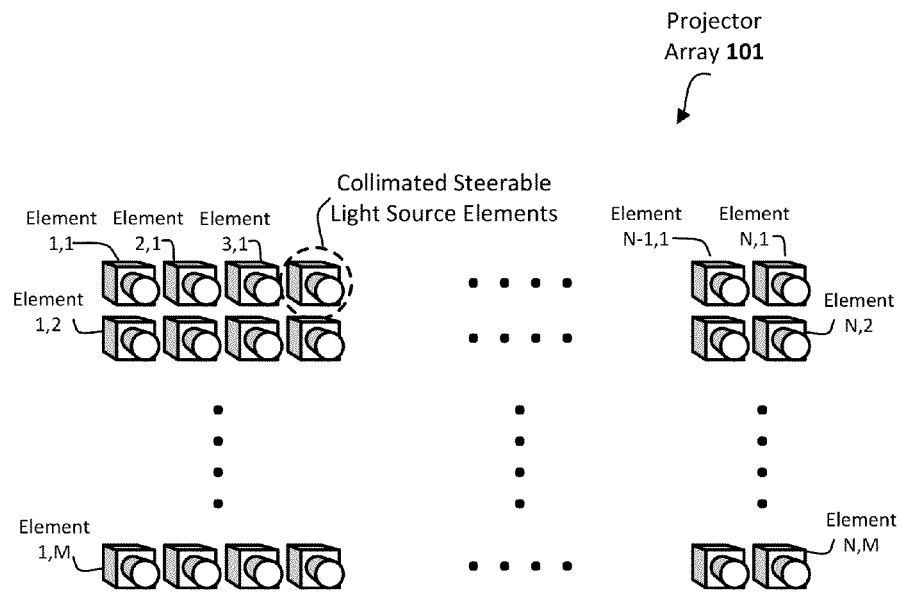
FIG. 2 illustrates an array of collimated steerable light source elements of a direct view display system, configured in accordance with an embodiment of the present disclosure.

FIG. 1 illustrates a direct view display system 100 configured in accordance with an embodiment of the present disclosure. As can be seen, the system 100 generally includes an N×M projector array 101, an array screen 103, and display electronics 105. The array 101 is implemented with N×M collimated steerable light source elements as shown in FIG. 2. Each element of the array 101 is a pixel of the display 100. The display electronics 105 includes typical circuitry including a display controller that is configured implement the direct viewing techniques provided herein. As can further be seen, the electronics 105 may include a camera. The array screen 103 can be implemented, for example, with any material that is optically transparent to the beams emitted from the array 101, in some embodiments. In other embodiments, the array screen 103 is configured with a plurality of holes corresponding to the emitter of the array 101. Further details of the array 101 and electronics 105 will be provided with reference to FIGS. 2, 3a-e, and 4a-b.

The system 100 can have any number of form factors. For example, the system 100 may be a television of any size (e.g., 20 to 100 inch viewing screen). Alternatively, the system 100 can be a portable computing device, such as a smart phone, tablet computer, or laptop computer. Alternatively, the system 100 can be a desktop display for computer system. Alternatively, the system 100 can be an electronic sign or billboard. Alternatively, the system 100 can be a movie theatre screen of any size. In short, the direct view display technology provided herein can be used in any display application, and particularly those where specific imaging at specific viewing locations is desired.

As will be appreciated, any number of desired resolutions can be used depending on the application, and the present disclosure is not intended to be limited to any particular one. In one example embodiment, the resolution provided by the system 100 is 720p so as to provide a progressive high definition signal format having 720 horizontal lines and an aspect ratio of 16:9 (e.g., 1280×720, where N=1280 and M=720). In one specific such embodiment, the array 101 is implemented with 921,600 discrete collimated steerable light source elements (0.9 megapixels). In other embodiments, those elements can be implemented using an integrated semiconductor process on a common substrate or a group of substrates operatively coupled to one another to provide a larger display system 100. While megapixel applications provide various benefits, other embodiments can be implemented with lower resolution such as applications that only require collimated steerable light source elements in the range of two to hundreds, or thousands, or tens of thousands. The resolution of the display system can depend on any number of factors such as the purpose of the display (e.g., high resolution graphics or simple signage), the content to be communicated (e.g., high definition movie or low definition text display or simply symbols), the desired image quality and color.

As will be further appreciated, the source of the images to be displayed will depend on the application. For instance, in a broadcasting application such as HDTV, the images to be displayed can be received in a particular format that complies with a given broadcasting standard, such as Advanced Television Systems Committee (ATSC) standards, Digital Video Broadcasting (DVB) standards, Society of Motion Picture and Television Engineers (SMPTE) standards. Alternatively, in a movie theater application the images can be sourced from a local movie medium (e.g., digital data file, analog film, DVD, etc). Alternatively, in a computer-based application the images can be sourced from a local hard drive or processor (e.g., digital data file, DVD, graphics processor generated or otherwise computer generated, etc) or a remote storage facility via the Internet and/or some other communication network (e.g., cloud-based photo and/or video repository such as YouTube, etc). In any such cases, the image content can be received and deconstructed to provide drive signals to the array 101 of elements to provide a direct view display experience.

As can be seen in FIG. 2, the projector array 101 can be implemented with a plurality of collimated, steerable light source elements arranged into a two-dimensional array of N×M elements. In this embodiment, each element provides one pixel of the display 100. In other embodiments, groups of elements could be used to provide a pixel if so desired. Note that M and N can be equal but need not be, and in certain applications, the number of columns (N) in the array 101 is greater than the number of rows (M) in the array 101 so as to provide a widescreen display. Any number of display configurations can be used however, as will be appreciated in light of this disclosure.

In one example embodiment, each collimated, steerable light source element is implemented with a three-color (red-green-blue) laser steered by an actuator such as a microelectromechanical system (MEMS) device or a piezo electric device or a gimbal assembly. In a more general sense, any actuator that provides a predictable repeatable scan path in response to a stimulus can be used to steer the light source or scan mirror at the output of the light source, as the case may be. The three-color laser can be, for example, three distinct eye-safe lasers: one red, one green and one blue. As is known, numerous colors can be made from such an R-G-B light source based on the drive signal applied to the individual lasers making up that source. In particular, the intensity of the individual red, green and blue lasers can be varied to generate a full color palette. So, for instance, a blue pixel could be provided by turning on the blue laser and turning off the red and green lasers. Likewise, for purple pixels, the red and blue lasers can be turned on and the green laser can be turned off. To this end, an optical combiner element can be provisioned at the output of the R-G-B emitter to combine the beams into a desired output beam that can be directed to a location in the viewing area.

Note that the beam divergence from the projector array 101 to the viewing location need not be null, and in some embodiments is about 1 millimeter (mm) per meter of travel distance, although other beam divergence ratings can be used as well depending on the travel distance between the projector array 101 and the target viewing locations. The spot size at the viewing location can be, for example, in the range of slightly larger than the pupil size of the viewer's to less than half the distance between the viewer's pupils. A typical pupil diameter is in the range of about 3 to 9 mm depending on the available ambient light, and the average distance between a person's pupils is about 6 centimeters (cm). In some specific embodiments, the collimated light source has a small enough beam spot size to project independently to a pupil without interfering with other pupils in the viewing area. One constraint in this regard is the separation of two pupils on a single individual. Another potential constraint is the distance from the side of a first viewer's head to a pupil associated with a second viewer sitting just behind and slightly offset from the first viewer. In general, the half distance between an individual's pupils is the more constraining of the two (half distance is chosen over full distance to comprehend light reflected off the side of the viewer's nose creating a visual distraction). The distance between pupils ranges from 41 mm for a particularly small child to 70 mm for a particularly large adult. This gives a starting constraint of about 20 mm for the spot size of each of the collimated beam coming from array 101. So, assuming an initial beam size of 1 mm (at output of array 101) and further assuming beam divergence of about 1 mm per meter of distance, the resulting spot size in the viewing area would be about 20 mm or less out to 20 meters. A movie theater averages about 20 to 25 meters in depth, and home theatres of course considerably smaller.

Also note that the form factor width of an individual element of the array 101 can be reduced to accommodate higher resolution displays. For instance, light source elements having a 5.4 mm width can be used to create a 4k image on an IMAX screen. Alternatively, light source elements having a 5.2 mm width can be used to create a 4k image on STD movie screen. Alternatively, light source elements having 1.88 mm width can be used to create 1080p on an 80 inch wide screen. Standard semiconductor integrated circuitry manufacturing techniques can be used to provision compact R-G-B laser light source elements that are scannable by an actuator. For example, in one example embodiment, the elements of the array 101 can be implemented using pico-projectors such as those available from Microvision. In general, the pico-projector uses a MEMS mirror to steer a tri-colored laser source to draw a picture. As will be appreciated in light of this disclosure, such pico-projectors can be implemented into an array 101 to provide a direct view display screen 100 as variously provided herein (with the optical power appropriately reduced), with each pico-projector providing one pixel (or a sub-pixel, as the case may be) of a given image at a given location. The display controller or the pico-projector themselves can be configured to generate corresponding control signals from an image data source to control the color mix and synchronize placement of individual pixels in the viewing area. Recall that the viewer looks directly at the display 100, not a projection surface (as is the case with a typical movie theatre screen). As previously explained, no one light source element of the array 101 provides a complete image. Rather, each element of the array 101 provides a pixel (or sub-pixel) of a given image to be provided at a given scan position. The array 101 may be scanned in a row by row or column by column fashion.

FIG. 3a illustrates a direct view display system configured to provide two different image sets to two different viewing locations, respectively, in accordance with an embodiment of the present disclosure. As can be seen, a viewer A at viewing location A receives the first image set, and a viewer B at viewing location B receives the second image set. This relatively simply example scenario could be, for example, a movie screen or a computer display screen shared by office workers. The first image set could be a first movie or photograph or some other content to be consumed by viewer A. The second image set could be a different movie or photograph or some other content to be consumed by viewer B, or could be the same movie or photograph or other content but provide viewer B with a different perspective than the perspective provided to viewer A.

Figure 3B:
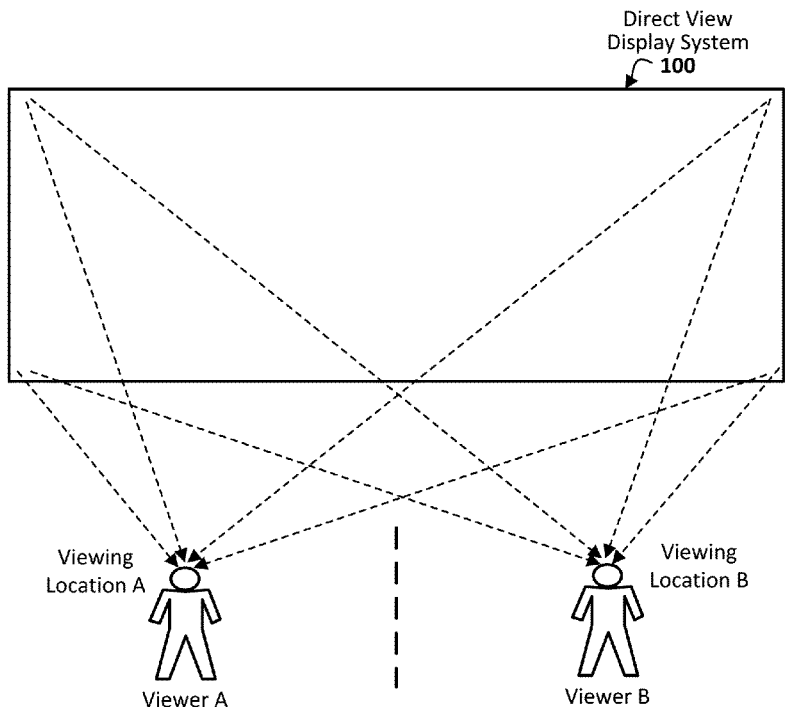
FIG. 3b illustrates the array of collimated steerable light source elements of the direct view display system shown in FIG. 3a at scan position B, in accordance with an embodiment of the present disclosure.
Figure 3B:
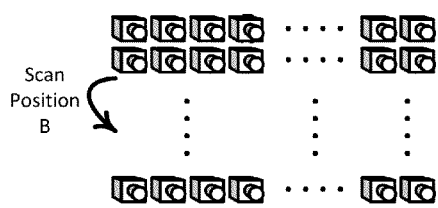
Figure 3C:
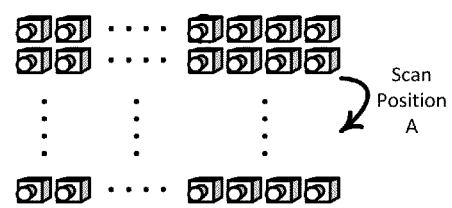
FIG. 3c illustrates the array of collimated steerable light source elements of the direct view display system shown in FIG. 3a at scan position A, in accordance with an embodiment of the present disclosure.

FIG. 3b illustrates the array of collimated steerable light source elements of the direct view display system shown in FIG. 3a at scan position B, in accordance with an embodiment of the present disclosure. Note how the elements of the projector array 101 are scanned or otherwise adjusted to scan position B so that all the elements point to viewing location B. FIG. 3c illustrates the array of collimated steerable light source elements of the direct view display system shown in FIG. 3a at scan position A, in accordance with an embodiment of the present disclosure. Here, the elements of the projector array 101 are scanned to scan position A so that the elements all point to viewing location A. All elements provide a pixel (or subpixel) of the projected image.

Figure 3D:
FIG. 3d illustrates an example image B projected by the array of collimated steerable light source elements of the direct view display system shown in FIG. 3a at scan position B, in accordance with an embodiment of the present disclosure.
Figure 3E:
FIG. 3e illustrates an example image A projected by the array of collimated steerable light source elements of the direct view display system shown in FIG. 3a at scan position A, in accordance with an embodiment of the present disclosure.

FIG. 3d illustrates an example image B projected by the array 101 of collimated steerable light source elements at scan position B, and FIG. 3e illustrates an example image A projected by the array 101 at scan position A, in accordance with an embodiment of the present disclosure. In both these examples, the content is a still image, but as previously explained it could be any desired content (e.g., movie, advertisement, employee work product, email, home work, etc). In this example case, viewer A sees a display of a dog, and viewer B sees a display of a cat. Each viewer fundamentally sees something different while simultaneously viewing the same screen.

The techniques can be further expanded to create a stereoscopic image by shining a different image to the left and the right pupil (a stereoscopic image pair) of a given viewer. In these example cases, it is assumed that the locations of the viewer's pupils are known. However, that is not required in all cases. For example, the locations of the viewer's pupils are not required if all viewers are viewing the same image. Nor are the locations of the viewer's pupils required for projection of a 2D or 3D image that enables the viewers to walk around the viewing area and view different perspectives of the 2D or 3D scene being projected. In any such cases, the array 101 of steerable collimated light source elements can be used to project a different image to different viewing angles. Since the disclosed collimated, array affords both horizontal and vertical viewing angle selectivity, the viewer can peer below or above a projected object, as well as around it. A taller person can see a different image than a shorter person. A person to the left will see a different image than a person to the right. Many other interesting use cases will be apparent.

As will be further appreciated in light of this disclosure, a person can walk around the viewing area from side-to-side, front-to-back, and any other direction on a straight or irregular path (e.g., diagonally or zig-zag, etc), and the perspective will change accordingly. For instance, if a person moves laterally in front of the display 100 along a line at 4 meters from the display 100 (e.g., viewer is moving in a direction parallel to the viewing surface of the display 100), then that person may see a different image or perspective with each step or even by leaning one way or the other along that lateral line, much like when a person moves from one side of a room to the other while looking out a window. This is because each viewing location along that line can receive a different image (e.g., every 6 centimeters receives a different image set, in one example embodiment). Likewise, if a person moves toward or away from the display 100 (e.g., viewer is moving in a direction perpendicular to the viewing surface of the display 100), then that person may see a different image or perspective with each step or even by leaning forward or backward, much like when a person moves a coffee mug from arm's length to the bridge of his/her nose. So, for instance, assume a projector has three neighboring projectors A, B, and C in array 101, and the user may see beams A and B at 6 meters. As the user walks toward the display 100 to a distance of 3 meters, now the user may see beams A and C and beam B will be about on the bridge of the viewer's nose (e.g., because the distance between the beams is smaller at that viewing distance). As the user walks away from the display 100 to a distance of 9 meters, the user may see beam A only (e.g., because the beam divergence at that viewing distance allows one beam at both eyes).

Figure 4A:
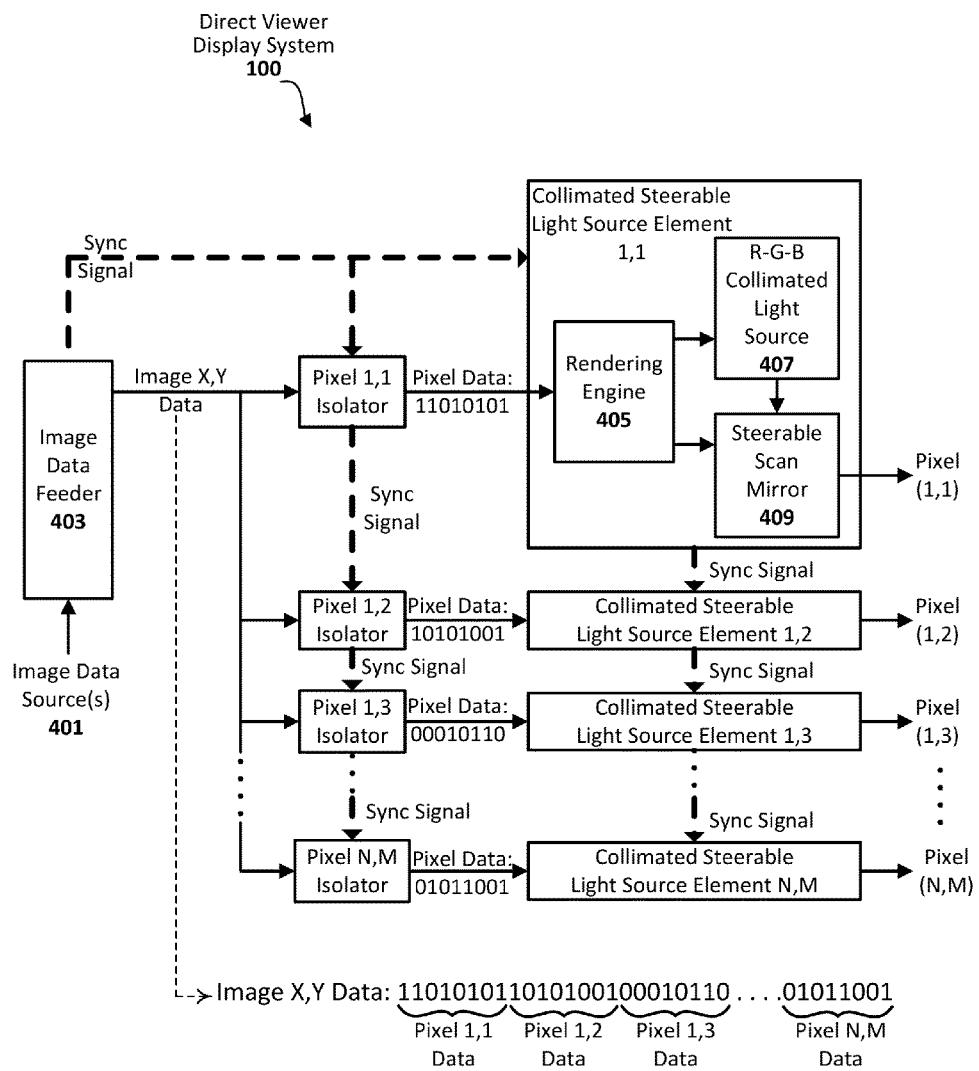
FIG. 4a is a block diagram of a direct view display system configured in accordance with an embodiment of the present disclosure.

FIG. 4a is a block diagram showing further details of the direct view display system 100, configured in accordance with an embodiment of the present disclosure. As can be seen, the system includes an image data feeder configured to receive image data from one or more image sources 401 (e.g., digital broadcast data, digital photo data files stored locally and/or remotely, digital video data files stored locally and/or remotely, DVD, computer generated, etc), and to interleave or otherwise provide image data for a given image to each of a plurality of collimated steerable light source elements in array 101. As previously explained, each collimated steerable light source element synchronously projects a pixel or subpixel of a given image, such that the entire array projects one complete image. A clock or other suitable sync signal, which is generated by the image data feeder 403 in this example embodiment, allows for the synchronous projection by the array of elements.

In this example case, a set of images is provided for projection by the array. For purposes of discussion, the image set is represented by a two-dimensional array (X,Y) or grid of images, although any number of image set designations can be used, as will be appreciated. So, the collimated steerable light source elements in array 101 collectively project one image from the image set X,Y to a corresponding viewing location. Each viewing location can receive a different image from the image set X,Y. Recall that the images of image set X,Y may be related but need not be. For instance, the images projected from set X,Y may represent a single scene snapshot from a movie, where each image in the set shows a slightly different viewing perspective of that scene. Every scene snapshot can have its own image set X,Y. Each image in a given set can be projected by the array 101 to a viewing location that corresponds to the viewing perspective associated with that image, when the array 101 is commanded to the scan position that corresponds to that viewing location. To make an analogy, think of the display 100 as a stage upon which an opera is being carried out in front of a live audience. Each viewer in the audience viewing the stage is associated with a viewing location, and any one viewer's view of the opera will be slightly different from other viewer's. In this sense, viewing the display 100 can be much like watching a performance on stage. Different image sets can be beamed to different viewing locations to give viewers a unique viewing experience, just as if they were watching a live performance from their respective seats. In other embodiments, each viewing location, or some subset of viewing locations as the case may be, may receive completely different, unrelated content As can be further seen in FIG. 4a, each light source element is operatively coupled with a pixel isolator, so that individual pixel data (or sub-pixel data, as the case may be) of a given image from set X,Y can to be selectively provided to a corresponding light source element. So, the array 101 includes light source elements 1,1 through N,M, as well as corresponding pixel isolators 1,1 through N,M. Note that the pixel isolators are shown distinct from the light source elements, but in other configurations the isolators may be integrated into the light source elements. In one example embodiment, the pixel isolators are implemented as a mask that passes the target pixel data and not the other pixel data, but any suitable pixel isolation technique can be used. In general, the digital data stream representing the image can be deconstructed into pixel chunks and passed accordingly, as can be further seen in FIG. 4a. This masking or chunking process may be implemented in software or hardware, and can be clocked or otherwise synchronized (sync signal, as shown) to simultaneously pass pixel data for a given image to the corresponding light source elements for projection to a corresponding viewing location by virtue of a corresponding array scan position. As is generally known, the number of bits per pixel (bpp) can vary depending on the color scheme desired (e.g., 1 bpp provides 2 colors or monochrome; 2 bpp provides 4 colors; 3 bpp provides 8 colors; 8 bpp provides 256 colors; 16 bpp provides 65,536 colors, and 24 bpp provides 16,777,216 colors or so-called true color). The example embodiment shown in FIG. 4a assumes 8 bpp, but other embodiments can use a lower or higher bpp as desired.

As can be further seen in this example embodiment, each steerable collimated light source in the array 101 includes a rendering engine 405, an R-G-B collimated light source 407, and a steerable scan mirror 409. The rendering engine 405 is configured to convert the received pixel data into corresponding control signals for driving the R-G-B light source 407 and steerable scan mirror 409, accordingly. Note that the sync signal generated by the image data feeder 403 can be used to synchronize placement of individual pixels in a corresponding viewing location. In some embodiments, each light source 407 includes an optical element for combining discrete R-G-B light sources into a beam of the desired color and spot size, and the steerable scan mirror 409 is configured to scan the combined beam to reproduce a pixel for each image in a given image set. The output beams provided by each of the steerable scan mirrors 409 collectively provides the pixels (or sub-pixels) making up one complete image. In the example shown, the pixels are labeled 1,1 to N,M.

Figure 4B:
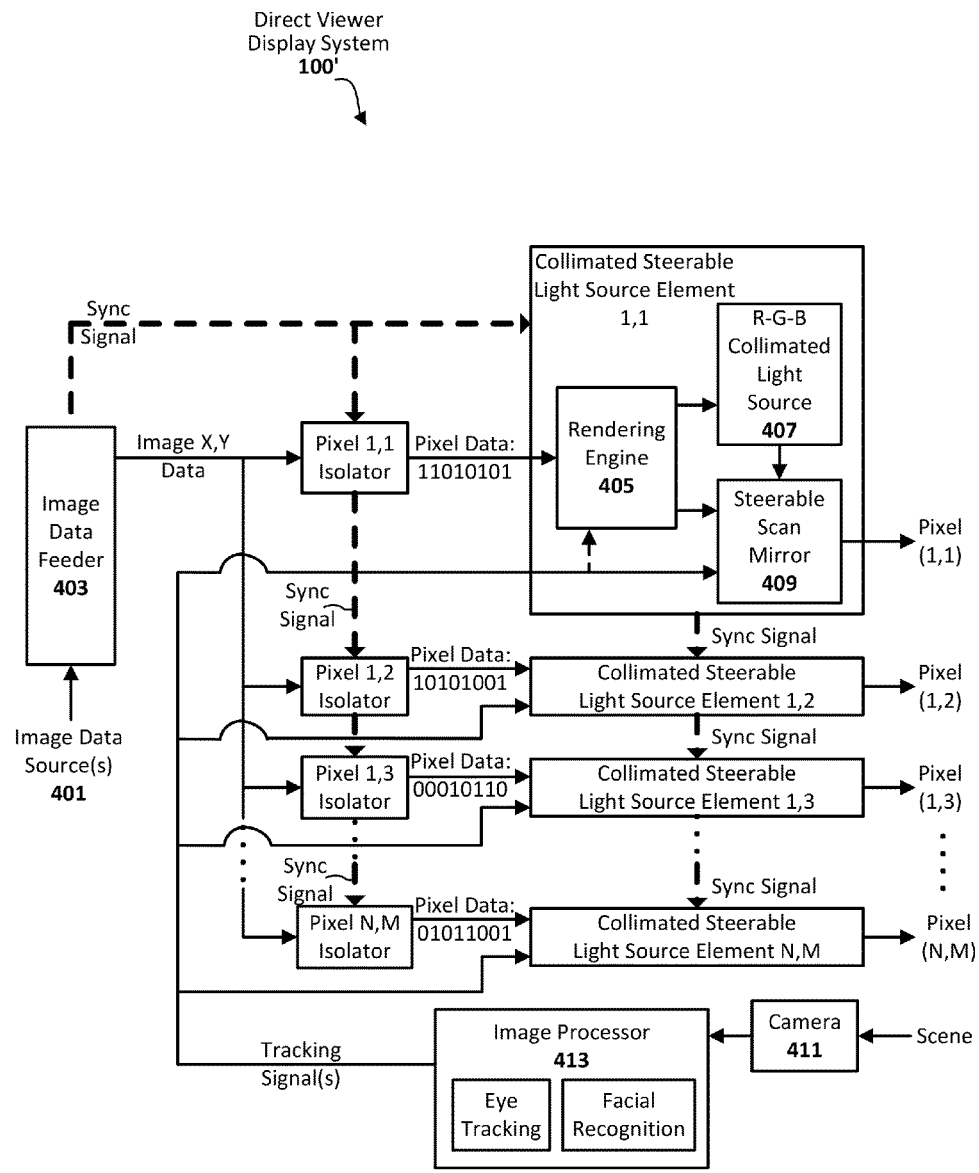
FIG. 4b is a block diagram of a direct view display system configured in accordance with another embodiment of the present disclosure.

FIG. 4b is a block diagram of a direct view display system configured in accordance with another embodiment of the present disclosure. As can be seen, the example configuration the display system 100' is similar to the display system 100 shown in FIG. 4a, but further includes a camera 411 and an image processor 413. In operation, the camera 411 can be used to capture scene information including the location and countenance of viewers in the viewing area. The image processor 413 is programmed or otherwise configured to analyze the captured scene data, and in this example embodiment includes eye tracking and facial recognition capabilities. Each of the eye tracking and facial recognition processes executed by the image processor 413 can be implemented using any number of known techniques, and the present disclosure is not intended to be limited to any particular types. In any case, the resulting tracking signals can then be used to instruct the rendering engine 405 and scan mirror 409 accordingly, as will be appreciated in light of this disclosure. The ability to perform eye tracking on individuals in the viewing area gives rise to a number of interesting use cases, particularly when combined with facial recognition or some other suitable identity-confirming mechanism (e.g., eye scans or other biometric).

For instance, in applications where privacy or security is important, the display 100' can project content securely to only one or more select individuals in the viewing area. Consider, for example, a person viewing a laptop on an airplane. Further assume the person is sitting in the middle seat, with two other passengers to either side. In such a case, the user of the display 100' can engage a so-called privacy mode which in turn activates the camera 411 and image processor 413. In other embodiments, the privacy mode can always be engaged. In still other embodiments, the camera 411 can be always on and the image processor 413 can be further configured to detect the need for privacy due to, for example, crowding or other unexpected viewers and to automatically engage the privacy mode. In any such cases, the display 100' can track the target viewer's eyes (or even pupils) and only beam the projected content to that viewer's pupils. The two other passengers will simply see a blank screen should they look at display 100'. In still other embodiments, non-private content can be beamed to all other viewing locations, such as a desktop image or some other non-restricted content. Numerous other scenarios will be apparent (e.g., direct view display devices could be used by students taking test on the devices in an open class room, or by a doctor's office to make sure a patient's information is not viewed by the wrong people).

In another example scenario, some content files may be sensitive and only be intended for certain viewers or otherwise restricted. In such cases, for instance, if the restricted file is accessed, the display system 100' can be configured to first identify the viewer present using the facial recognition routine. Then, if appropriate, the restricted content can then be projected to that viewer's pupils. Eye tracking can be used to further ensure that only the viewer is provided the projection. Targeted advertising can also be used, where a potential customer that is recognized has having certain interests is provided an inviting display and may be notified of a sale on items that might be of interest to that particular viewer/customer. Numerous other privacy-based or otherwise targeted use cases will be apparent in light of this disclosure.

In still other embodiments, it may be desirable to only beam content to where it is needed, rather than to all available viewing locations. In such cases, eye tracking can be used to limit the projection to the target viewer's pupils only. There may be multiple target viewers in some scenarios. In such cases, each target viewer can be eye-tracked and/or facially identified as needed.

Other use cases may be found in any industries that rely upon visual displays: movies, digital signage, compute devices, smart phones, entertainment such as amusement parks and arcades, and any devices that have a display but require privacy of the displayed image. Privacy may be needed in any number of public or otherwise non-private locations such as mass transit vehicles (e.g., trains, busses, planes), common areas like a café, or open work spaces such as low wall cubicles. The systems and techniques provided herein can also be used to provide virtual windows/picture frames in various applications or scenarios. For example, in the context of military, transportation, and remote machine operation applications, the display systems and techniques provided herein can be used for an in-vehicle display that provide real window behavior to a remote location. In another example case, the display systems and techniques provided herein allow a user to achieve a certain desired aesthetic, such as the ability to create a virtual window in an interior office to make it look like a corner office or an otherwise more visually pleasing environment.

Viewing Area

Figure 5:
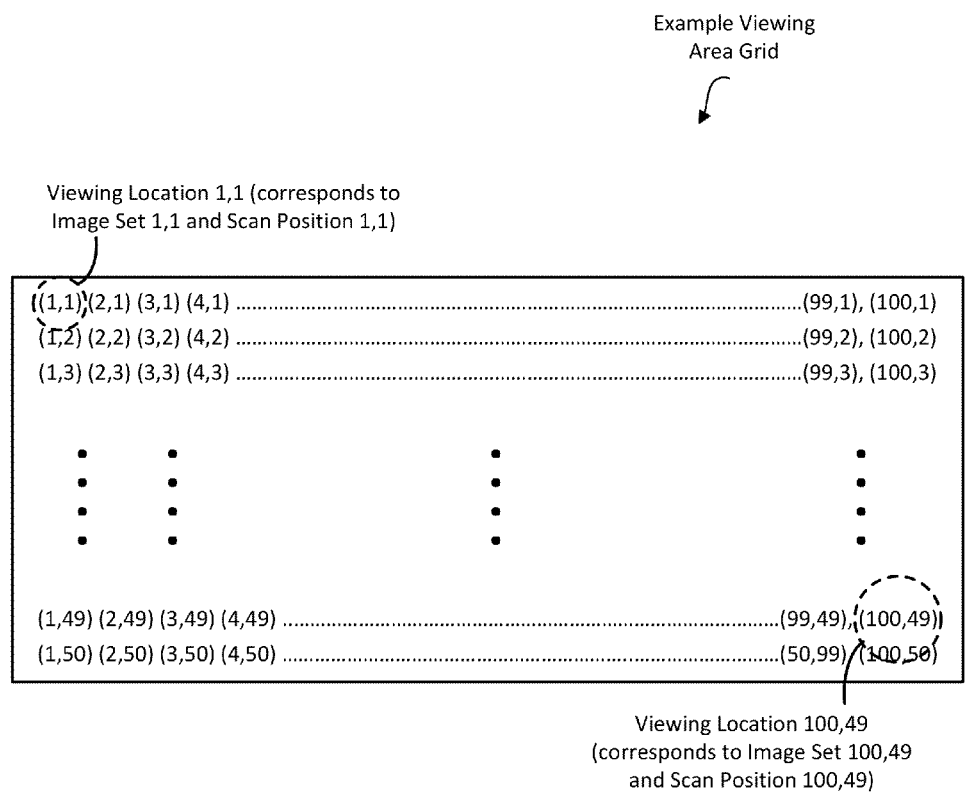
FIG. 5 illustrates an example grid of viewing locations for a direct view display system configured in accordance with an embodiment of the present disclosure.

FIG. 5 illustrates an example grid of viewing locations for a direct view display system configured in accordance with an embodiment of the present disclosure. As can be seen, the viewing area grid includes a plurality of viewing locations (1,1 to 100,50), each of which corresponds to an image set and a scan position. So, there are 1,1 to 100,50 image sets and 1,1 to 100,50 scan positions. As will be appreciated in light of this disclosure, all of these image sets are effectively projected at the same time to their respective viewing locations, given that the total scan time through the entire set of scan positions is generally not perceptible to a human, in accordance with some embodiments. To this end, the scan time between projections can be relatively small (e.g., 100 microseconds or less, or 50 microseconds or less, or 25 microseconds or less).

As previously explained, a viewer of the display system 100 is looking directly at the array of light emitters, and multiple images can be projected. As all the lasers/projector elements in the array 101 are pointed at a single viewing location they project a single image. A given viewing location in the viewing area corresponds to a scan position of the array 101. The lasers/projector elements in the array 101 scan to the next scan position and project a different image. As they move to the next scan position, yet another image, and so on. As discussed with respect to 3a, a display system 100 can be set up to project the picture of a dog when the array elements are pointed to the left half of the viewing area, and a cat when pointed at the right half of the viewing area. A person sitting in the left half of the viewing area will only see the dog, and a person sitting in the right half of the viewing area will only see the cat. A person sitting directly centered in the viewing area can lean right and left and correspondingly see the dog or the cat. If that person sits perfectly still while directly centered, one eye will receive the image of the dog, and the other eye will receive the image of the cat.

As will be appreciated in light of this disclosure, the display system 100 can be setup to project 3D images. The image source can be, for example, a series of digital pictures/photographs taken of the screen or object to be displayed. For example, imagine that a series of pictures of the Greek statue, Venus de Milo, were taken using the following procedure. First, draw a straight line on the floor, about 3 meters in front of the statue, about 6 m long. Then, put a camera on mount at 3 m above the floor, at the left hand side of the line, point the camera at the nose of the statue and take a picture, and label it (1,1). Then move the camera, along the line about 6 cm, point the camera at the nose of the statue and take a second picture, and label it (2,1). As previously indicated, recall that 6 cm is about the distance between a human's pupils. Now, continue taking pictures every 6 cm until you reach the end of the line and labeling each of them accordingly. The last picture on that line will be labeled (100,1). When the end of the line is reached, lower the camera 6 cm, and then repeat the process by photographing the statue along that line in 6 cm steps, thereby providing a second row of 100 photos. Repeat the process until the set of pictures along the floor have been completed. The last picture will be labeled (100,50). At the end of the process, you will have a full set of 5000 pictures.

In accordance with one example embodiment, the display system 100 can be used to display all 5000 images, so that a viewer walking around in the viewing area could stand in any one location and see different 3D perspectives of the statue. As the upper left light source element in the array 101 scans (or rasters across) the viewer area, it will display only the upper left pixel of each of the 5000 pictures at scan position 1,1. When this upper left array element is pointed to the upper left viewing 1,1 of the viewing area, it will show the upper left pixel from picture (1,1). Then, the array element scans 6 cm to the right and projects the upper left pixel from picture (2,1), and so on. So, the pictures are effectively interleaved across the array elements. No one element shows a whole picture, rather the whole array is needed to display an image.

Thus, an individual looking at the array 101 will have one image, say (1,1), projected to one pupil and a separate image, say (2,1) projected to the other pupil and thus see a 3D image. As the viewer moves around the viewing area, the 3D perspective will change. Note that this is different from a 3D movie, it is more like watching an opera or other live event on stage. If the viewer walks from one side to the other (or moves from the balcony to the orchestra area), that viewer's perspective of the actors and stage props changes. While the above scenario uses photographs as an explanatory example, a more practical image source can readily be achieved by using, for example, 3D engines for rendering virtual worlds to generate the various sets of images.

Figure 6A:
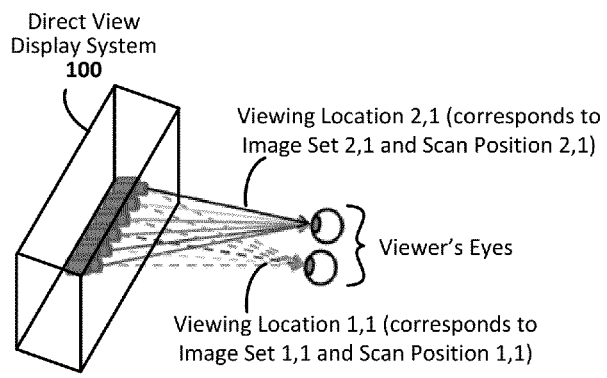
FIGS. 6a-b illustrate how a direct view display system configured in accordance with an embodiment of the present disclosure can be used to provide an image directly to a particular viewer.

FIG. 6a illustrates how a direct view display system 100 configured in accordance with an embodiment of the present disclosure can be used to provide an image directly to a particular viewer. Note that only one row of light source elements in the array 101 are shown to simply the illustration. As can be seen, the pupils of a viewer are each receiving a different set of images. In particular, the left pupil at viewing location 1,1 is receiving an image from image set 1,1 when the array is at scan position 2,1. At the same time, the right pupil at viewing location 2,1 is receiving an image from image set 2,1 when the array is at scan position 2,1. Note the use of the phrase "same time" is with respect to what is humanly perceptible and does not account for the transition time between scan positions (which is generally not perceptible to humans).

Figure 6B:
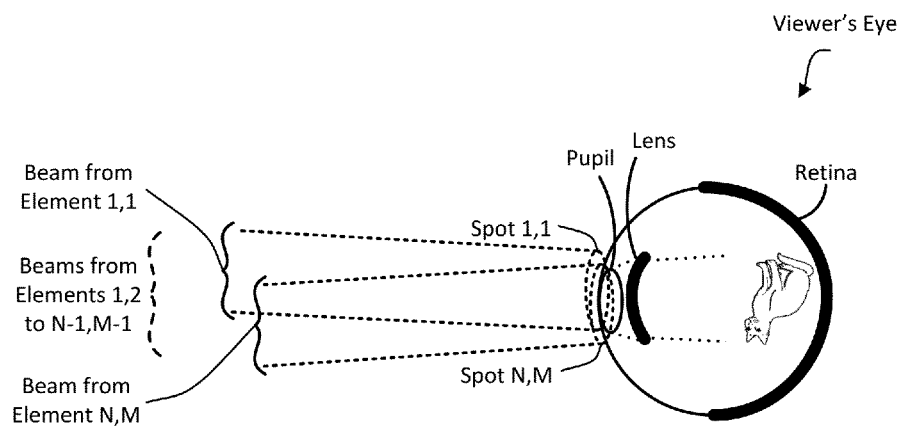

FIG. 6b demonstrates how the array simultaneously projects, at any one scan position, all the pixels to the viewer's pupil, in accordance with an embodiment. Note that the spot size of the projected beams (spot 1,1 to N,M) on the viewer's eye is slightly larger than the viewer's pupil, in this example case. As will be appreciated, the lens structure of the human eye focuses the incoming light provided from the beams into a picture-like image on the retina in the back of the eye.

Methodology

Figure 7:
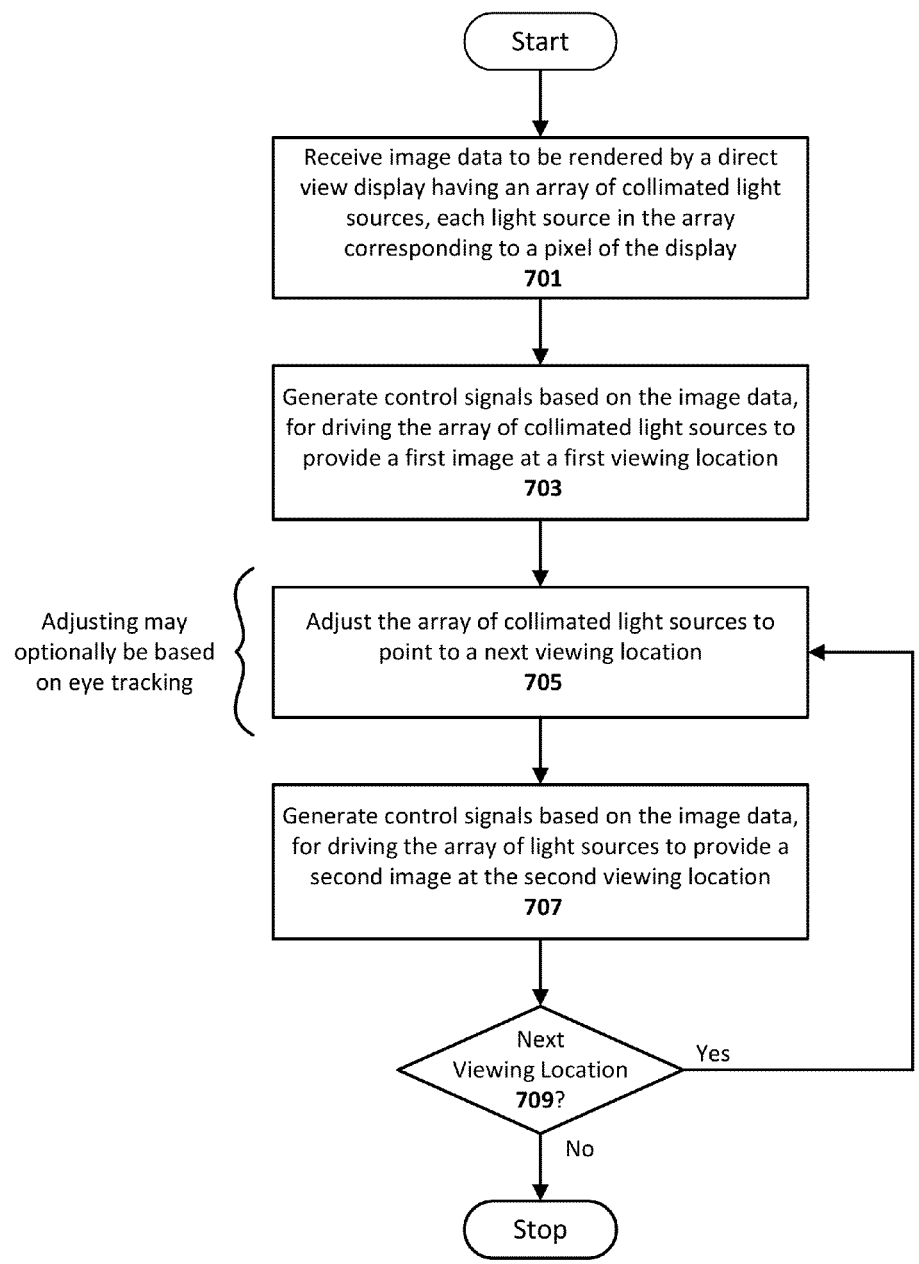
FIG. 7 illustrates a direct view display methodology configured in accordance with an embodiment of the present disclosure.

FIG. 7 illustrates a direct view display methodology configured in accordance with an embodiment of the present disclosure. The method may be implemented, for example, by a display controller. However, the functionalities provided herein can be carried out in a distributed nature as well, if so desired. For example, some functions can be carried out by a display controller and other functions can be carried out by components within a light source array operatively coupled to the display controller. Numerous such configurations will be apparent.

As can be seen, the method includes receiving 701 image data to be rendered by a direct view display. The direct view display includes an array of collimated light sources, each light source corresponding to a pixel of the display as variously described herein. In addition, the light source array can be scanned or otherwise adjusted to beam light (images) to different locations within the viewing area of the display. Viewers in the viewing area look directly at the display (such as shown in FIG. 3a).

The method continues with generating 703 control signals based on the image data, for driving the array of collimated light sources to provide a first image at a first viewing location. Note that the first viewing location is generally associated with a first scan position of the array. In some example embodiments, the generating 703 is carried out by a rendering engine associated with each pixel of the array, such as rendering engine 405 discussed with reference to FIGS. 4a-b. In other embodiments, note that a global rendering engine can be used to provide drive signals to all pixel generating elements (e.g., R-G-B laser light source). Variables such as display form factor and desired resolution can be considered when determining whether to employ a global or pixel based rendering scheme.

The method continues with adjusting 705 the array of collimated light sources to point to a second or next viewing location. As previously explained, the viewing area can be divided into discrete viewing locations, and each viewing location can correspond to a scan position of the array. In some example embodiments, the adjusting 705 is carried out by a rendering engine associated with each pixel of the array, such as rendering engine 405 discussed with reference to FIGS. 4a-b. In other embodiments, note that a global rendering engine can be used to provide drive signals to all scanning elements (e.g., MEMS-based mirror). So long as the individual pixels are timely provided at the desired locations, any number of suitable driving schemes can be used. Further note that the movement to a particular scan position can be in response to tracking signals derived from an eye tracking process, and may further be in response to a particular user being identified at that location. Any combination of eye-tracking and identity-confirming mechanisms can be used.

The method continues with generating 707 control signals based on the image data, for driving the array of light sources to provide a second image at the second viewing location. Note that the second viewing location is generally associated with a second scan position of the array. Just as with the generating at 703, generating 707 can be carried out, for example, by a pixel-based rendering element or a global-based rendering element. The first and second viewing locations may correspond, for instance, to the left and right pupils of a given viewer, thereby giving that viewer a 3D display experience (e.g., a 3D image or movie). Alternatively, the first viewing location may receive a first type of content and the second viewing location may receive a second type of content that is diverse and unrelated to the first type of content (e.g., first type is work product or an email or a first movie, and the second type is a screen saver image or a blank screen or a second movie).

The method continues with determining 709 if there are other viewing locations. If so, the method can be repeated. For instance, the adjusting at 705 can carried out so that the light source array if pointed at a third viewing location, and the generating 707 can be carried out to beam a third image that third location. And so on. As will be appreciated, the array can be scanned through all of its positions in a relatively fast manner (e.g., at sub-second speeds, such as less than 100 milliseconds, or faster).

Example System

Figure 8:
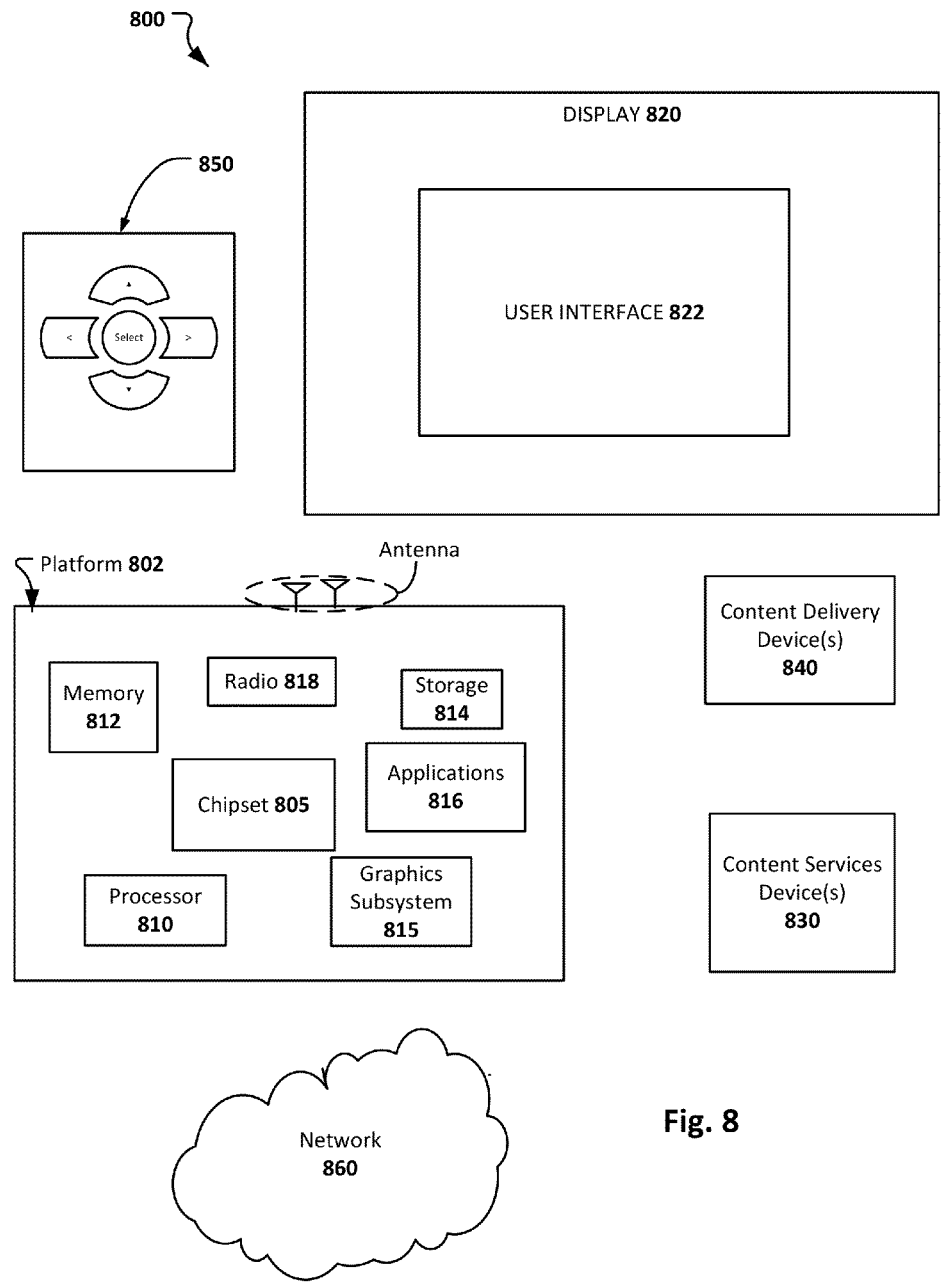
FIG. 8 illustrates a media system configured in accordance with an embodiment of the present disclosure.

FIG. 8 illustrates a media system 800 configured in accordance with an embodiment of the present disclosure. In some embodiments, system 800 may be a media system for showing movies or advertisements although system 800 is not limited to this context. For example, system 800 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, set-top box, game console, or other such computing environments capable of performing graphics rendering operations and displaying content.

In some embodiments, system 800 comprises a platform 802 coupled to a display 820. Platform 802 may receive content from a content device such as content services device(s) 830 or content delivery device(s) 840 or other similar content sources. A navigation controller 850 comprising one or more navigation features may be used to interact with, for example, platform 802 and/or display 820, so as to supplement navigational gesturing by the user. Each of these example components is described in more detail below.

In some embodiments, platform 802 may comprise any combination of a chipset 805, processor 810, memory 812, storage 814, graphics subsystem 815, applications 816 and/or radio 818. Chipset 805 may provide intercommunication among processor 810, memory 812, storage 814, graphics subsystem 815, applications 816 and/or radio 818. For example, chipset 805 may include a storage adapter (not depicted) capable of providing intercommunication with storage 814.

Processor 810 may be implemented, for example, as Complex Instruction Set Computer (CISC) or Reduced Instruction Set Computer (RISC) processors, x86 instruction set compatible processors, multi-core, or any other microprocessor or central processing unit (CPU). In some embodiments, processor 810 may comprise dual-core processor(s), dual-core mobile processor(s), and so forth. Memory 812 may be implemented, for instance, as a volatile memory device such as, but not limited to, a Random Access Memory (RAM), Dynamic Random Access Memory (DRAM), or Static RAM (SRAM). Storage 814 may be implemented, for example, as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In some embodiments, storage 814 may comprise technology to increase the storage performance enhanced protection for valuable digital media when multiple hard drives are included, for example.

Graphics subsystem 815 may perform processing of images such as still or video for display, and in some embodiments is configured to drive the array of light sources of a direct view display, as variously described herein. Graphics subsystem 815 may be a graphics processing unit (GPU) or a visual processing unit (VPU), for example. An analog or digital interface may be used to communicatively couple graphics subsystem 815 and display 820. For example, the interface may be any of a High-Definition Multimedia Interface, DisplayPort, wireless HDMI, and/or wireless HD compliant techniques. Graphics subsystem 815 could be integrated into processor 810 or chipset 805. Graphics subsystem 815 could be a stand-alone card communicatively coupled to chipset 805. The graphics and/or video processing techniques, including direct view projection techniques described herein, may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 818 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 818 may operate in accordance with one or more applicable standards in any version.

In some embodiments, display 820 may comprise any television or computer type monitor or display, but in one specific embodiment is a direct view display 100 such as those discussed with reference to FIGS. 1 through 7. For example, display 820 may include an array 101 of collimated steerable light sources configured to beam images to multiple viewing locations as variously described herein. The array 101 may be controlled in part by the graphics subsystem 815. For instance, and with further reference to FIGS. 4a-b, graphics subsystem 815 may include the functionality of one or more of the image data feeder 403, the pixel isolators, and the rendering engine(s) 405. Under the control of one or more software applications 816, platform 802 may display a user interface 822 on display 820.

In some embodiments, content services device(s) 830 may be hosted by any national, international and/or independent service and thus accessible to platform 802 via the Internet or other network, for example. Content services device(s) 830 may be coupled to platform 802 and/or to display 820. Platform 802 and/or content services device(s) 830 may be coupled to a network 860 to communicate (e.g., send and/or receive) media information to and from network 860. Content delivery device(s) 840 also may be coupled to platform 802 and/or to display 820. In some embodiments, content services device(s) 830 may comprise a cable television box, personal computer, network, telephone, Internet enabled devices or appliance capable of delivering digital information and/or content, and any other similar device capable of unidirectionally or bidirectionally communicating content between content providers and platform 802 and/display 820, via network 860 or directly. It will be appreciated that the content may be communicated unidirectionally and/or bidirectionally to and from any one of the components in system 800 and a content provider via network 860. Examples of content may include any media information including, for example, video, music, graphics, text, medical and gaming content, and so forth.

Content services device(s) 830 receives content such as cable television programming including media information, digital information, and/or other content. Examples of content providers may include any cable or satellite television or radio or Internet content providers. The provided examples are not meant to limit the present disclosure. In some embodiments, platform 802 may receive control signals from navigation controller 850 having one or more navigation features. The navigation features of controller 850 may be used to interact with user interface 822, for example. In some embodiments, navigation controller 850 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures, facial expressions, or sounds.

Movements of the navigation features of controller 850 may be echoed on a display (e.g., display 820) by movements of a pointer, cursor, focus ring, or other visual indicators displayed on the display. For example, under the control of software applications 816, the navigation features located on navigation controller 850 may be mapped to virtual navigation features displayed on user interface 822, for example. In some embodiments, controller 850 may not be a separate component but integrated into platform 802 and/or display 820. Embodiments, however, are not limited to the elements or in the context shown or described herein, as will be appreciated.

In some embodiments, drivers (not shown) may comprise technology to enable users to instantly turn on and off platform 802 like a television with the touch of a button after initial boot-up, when enabled, for example. Program logic may allow platform 802 to stream content to media adaptors or other content services device(s) 830 or content delivery device(s) 840 when the platform is turned "off." In addition, chipset 805 may comprise hardware and/or software support for 5.1 surround sound audio and/or high definition 7.1 surround sound audio, for example. Drivers may include a graphics driver for integrated graphics platforms. In some embodiments, the graphics driver may comprise a peripheral component interconnect (PCI) express graphics card. In one example embodiment, a driver programmed or otherwise configured to carry out the driving of an array 101 of a direct view display 100 as variously described herein.

In various embodiments, any one or more of the components shown in system 800 may be integrated. For example, platform 802 and content services device(s) 830 may be integrated, or platform 802 and content delivery device(s) 840 may be integrated, or platform 802, content services device(s) 830, and content delivery device(s) 840 may be integrated, for example. In various embodiments, platform 802 and display 820 may be an integrated unit. Display 820 and content service device(s) 830 may be integrated, or display 820 and content delivery device(s) 840 may be integrated, for example. These examples are not meant to limit the present disclosure.

In various embodiments, system 800 may be implemented as a wireless system, a wired system, or a combination of both. When implemented as a wireless system, system 800 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 800 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 802 may establish one or more logical or physical channels to communicate information. The information may include media information and control information. Media information may refer to any data representing content meant for a user. Examples of content may include, for example, data from a voice conversation, videoconference, streaming video, email or text messages, voice mail message, alphanumeric symbols, graphics, image, video, text and so forth. Control information may refer to any data representing commands, instructions or control words meant for an automated system. For example, control information may be used to route media information through a system, or instruct a node to process the media information in a predetermined manner (e.g., using hardware assisted for privilege access violation checks as described herein). The embodiments, however, are not limited to the elements or context shown or described in FIG. 8.

Figure 9:
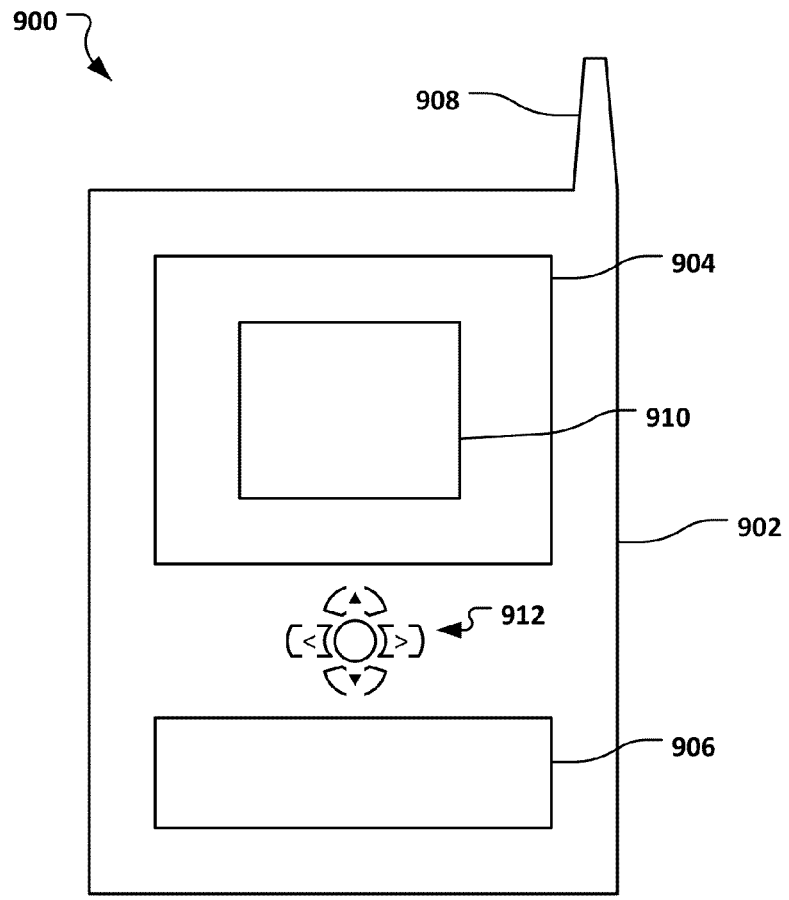
FIG. 9 illustrates a mobile computing system configured in accordance with an embodiment of the present disclosure.

As described above, system 800 may be embodied in varying physical styles or form factors. FIG. 9 illustrates embodiments of a small form factor device 900 in which system 800 may be embodied. In some embodiments, for example, device 900 may be implemented as a mobile computing device having wireless capabilities. A mobile computing device may refer to any device having a processing system and a mobile power source or supply, such as one or more batteries, for example.

As previously described, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In some embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 9, device 900 may comprise a housing 902, a display 904, an input/output (I/O) device 906, and an antenna 908. Device 900 also may comprise navigation features 912. Display 904 may comprise any suitable display unit for displaying information appropriate for a mobile computing device, which in one example embodiment is a pixelated display capable of direct view as provided herein. I/O device 906 may comprise any suitable I/O device for entering information into a mobile computing device. Examples for I/O device 906 may include an alphanumeric keyboard, a numeric keypad, a touch pad, input keys, buttons, a camera, switches, rocker switches, microphones, speakers, voice recognition device and software, and so forth. Information also may be entered into device 900 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Whether hardware elements and/or software elements are used may vary from one embodiment to the next in accordance with any number of factors, such as desired computational rate, power levels, heat tolerances, processing cycle budget, input data rates, output data rates, memory resources, data bus speeds and other design or performance constraints.

Some embodiments may be implemented, for example, using a machine-readable medium or article which may store an instruction or a set of instructions that, if executed by a machine, may cause the machine to perform a method and/or operations in accordance with an embodiment of the present disclosure. Such a machine may include, for example, any suitable processing platform, computing platform, computing device, processing device, computing system, processing system, computer, processor, or the like, and may be implemented using any suitable combination of hardware and software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of executable code implemented using any suitable high-level, low-level, object-oriented, visual, compiled and/or interpreted programming language.

Further Example Embodiments

The following examples pertain to further embodiments, from which numerous permutations and configurations will be apparent.

Example 1 is a method for displaying content to a viewing area, comprising: receiving image data to be rendered by a direct view display, the direct view display including an array of collimated steerable light sources, each light source corresponding to a pixel of the display; generating control signals based on the image data, for driving the array of collimated light sources to provide a first image at a first viewing location in the viewing area; adjusting the array of collimated light sources to point to a second viewing location in the viewing area; and generating control signals based on the image data, for driving the array of light sources to provide a second image at the second viewing location.

Example 2 includes the subject matter of Example 1, wherein the method is carried out at least in part by a display controller.

Example 3 includes the subject matter of Example 1 or 2, wherein generating control signals based on the image data is carried out by one or more rendering engines included in the array.

Example 4 includes the subject matter of Example 3, wherein each collimated steerable light source is associated with a rendering engine.

Example 5 includes the subject matter of Example 3 or 4, wherein each collimated steerable light source is associated with a scanning mirror.

Example 6 includes the subject matter of any of the preceding Examples, wherein adjusting the array of collimated light sources is carried out by one or more actuator devices included in the array.

Example 7 includes the subject matter of Example 6, wherein the one or more actuator devices are microelectromechanical system (MEMS) device.

Example 8 includes the subject matter of Example 6 or 7, wherein each collimated steerable light source is associated with an actuator device operatively coupled with a scanning mirror.

Example 9 includes the subject matter of any of the preceding Examples, wherein each collimated steerable light source includes a red laser source, a green laser source and a blue laser source.

Example 10 includes the subject matter of any of the preceding Examples, wherein each viewing location in the viewing area corresponds to a scan position of the array.

Example 11 includes the subject matter of any of the preceding Examples, further comprising: projecting the first image to the first viewing location; and projecting the second image to the second viewing location.

Example 12 includes the subject matter of any of the preceding Examples, wherein the first and second viewing locations correspond to the left and right eyes of a viewer in the viewing area.

Example 13 includes the subject matter of Example 12, further comprising identifying the viewer.

Example 14 includes the subject matter of any of the preceding Examples, wherein prior to adjusting the array of collimated light sources to point to a second viewing location in the viewing area, the method comprises: tracking at least one eye of a viewer in the viewing area to the second viewing location.

Example 15 includes a direct view display system, comprising: an array of collimated steerable light sources, each light source corresponding to a pixel of the display; one or more rendering engines configured to generate control signals based on image data, for driving the array of collimated light sources to provide a first image at a first viewing location in the viewing area; one or more actuators configured to adjust the array of collimated light sources to point to a second viewing location in the viewing area; and wherein the one or more rendering engines is further configured to generate control signals based on the image data, for driving the array of light sources to provide a second image at the second viewing location.

Example 16 includes the subject matter of Example 15, wherein the system is at least in part a display controller.

Example 17 includes the subject matter of Example 15 or 16, wherein each collimated steerable light source is associated with a rendering engine.

Example 18 includes the subject matter of any of Examples 15 through 17, wherein each collimated steerable light source is associated with an actuator.

Example 19 includes the subject matter of any of Examples 15 through 18, wherein each collimated steerable light source is associated with a scanning mirror operatively coupled to the one or more actuators.

Example 20 includes the subject matter of Example 18 or 19, wherein each actuator is a microelectromechanical system (MEMS) device.

Example 21 includes the subject matter of any of Examples 15 through 20, wherein each collimated steerable light source is steerable independently of the other collimated steerable light source.

Example 22 includes the subject matter of any of Examples 15 through 21, wherein each collimated steerable light source includes a red laser source, a green laser source and a blue laser source.

Example 23 includes the subject matter of any of Examples 15 through 22, wherein each viewing location in the viewing area corresponds to a scan position of the array.

Example 24 includes the subject matter of any of Examples 15 through 23, where each collimated steerable light source in the array is configured to project a pixel or sub-pixel of a given image to one or more viewing locations within the viewing area, such that no one light source provides an entire image.

Example 25 includes the subject matter of any of Examples 15 through 24, wherein the first and second viewing locations correspond to the left and right eyes of a viewer in the viewing area.

Example 26 includes the subject matter of any of Examples 15 through 25, further comprising a camera.

Example 27 includes the subject matter of any of Examples 15 through 26, further comprising an identity-confirming mechanism configured to identify a target viewer in the viewing area.

Example 28 includes the subject matter of Example 27, wherein the identity-confirming mechanism includes a facial recognition processor that operates on images captured from the viewing area.

Example 29 includes the subject matter of any of Examples 15 through 28, further comprising: an eye tracking processor configured to track at least one eye of a viewer in the viewing area to the second viewing location.

Example 30 includes a non-transient computer program product (e.g., one or more tangible computer readable mediums) encoded with instructions that when executed by one or more processors cause a process for displaying content to a viewing area to be carried out, the process comprising: receiving image data to be rendered by a direct view display, the direct view display including an array of collimated steerable light sources, each light source corresponding to a pixel of the display; generating control signals based on the image data, for driving the array of collimated light sources to provide a first image at a first viewing location in the viewing area; adjusting the array of collimated light sources to point to a second viewing location in the viewing area; and generating control signals based on the image data, for driving the array of light sources to provide a second image at the second viewing location.

Example 31 includes the subject matter of Example 30, wherein the process is carried out at least in part by a display controller.

Example 32 includes the subject matter of Example 30 or 31, wherein generating control signals based on the image data is carried out by one or more rendering engines included in the array.

Example 33 includes the subject matter of Example 32, wherein each collimated steerable light source is associated with a rendering engine.

Example 34 includes the subject matter of Example 32 or 33, wherein each collimated steerable light source is associated with a scanning mirror.

Example 35 includes the subject matter of any of Examples 30 through 34, wherein adjusting the array of collimated light sources is carried out by one or more actuator devices included in the array.

Example 36 includes the subject matter of Example 35, wherein the one or more actuator devices are microelectromechanical system (MEMS) device.

Example 37 includes the subject matter of Example 35 or 36, wherein each collimated steerable light source is associated with an actuator device operatively coupled with a scanning mirror.

Example 38 includes the subject matter of any of Examples 30 through 37, wherein each collimated steerable light source includes a red laser source, a green laser source and a blue laser source.

Example 39 includes the subject matter of any of Examples 30 through 38, wherein each viewing location in the viewing area corresponds to a scan position of the array.

Example 40 includes the subject matter of any of Examples 30 through 39, the process further comprising: projecting the first image to the first viewing location; and projecting the second image to the second viewing location.

Example 41 includes the subject matter of any of Examples 30 through 40, wherein the first and second viewing locations correspond to the left and right eyes of a viewer in the viewing area.

Example 42 includes the subject matter of Example 41, the process further comprising identifying the viewer.

Example 43 includes the subject matter of any of Examples 30 through 42, wherein prior to adjusting the array of collimated light sources to point to a second viewing location in the viewing area, the process comprises: tracking at least one eye of a viewer in the viewing area to the second viewing location.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner, and may generally include any set of one or more limitations as variously disclosed or otherwise demonstrated herein.

What is claimed is:

1. A method for displaying content to a viewing area, comprising:
   receiving image data to be rendered by a direct view display, the direct view display including an array of collimated steerable light sources, each light source corresponding to a pixel of the display;
   generating control signals based on the image data, for driving the array of collimated light sources to provide a first image at a first viewing location in the viewing area;
   adjusting the array of collimated light sources to point to a second viewing location in the viewing area; and
   generating control signals based on the image data, for driving the array of light sources to provide a second image at the second viewing location.

2. The method of claim 1, wherein generating control signals based on the image data is carried out by one or more rendering engines included in the array.

3. The method of claim 2, wherein each collimated steerable light source is associated with a rendering engine.

4. The method of claim 1, wherein adjusting the array of collimated light sources is carried out by one or more actuator devices included in the array.

5. The method of claim 1, wherein each viewing location in the viewing area corresponds to a scan position of the array.

6. The method of claim 1, further comprising:
   projecting the first image to the first viewing location; and
   projecting the second image to the second viewing location.

7. The method of claim 1, wherein the first and second viewing locations correspond to the left and right eyes of a viewer in the viewing area.

8. The method of claim 7, further comprising identifying the viewer.

9. The method of claim 1, wherein prior to adjusting the array of collimated light sources to point to a second viewing location in the viewing area, the method comprises:
   tracking at least one eye of a viewer in the viewing area to the second viewing location.

10. A direct view display system, comprising:
    an array of collimated steerable light sources, each light source corresponding to a pixel of the display;
    one or more rendering engines configured to generate control signals based on image data, for driving the array of collimated light sources to provide a first image at a first viewing location in the viewing area;
    one or more actuators configured to adjust the array of collimated light sources to point to a second viewing location in the viewing area; and
    wherein the one or more rendering engines is further configured to generate control signals based on the image data, for driving the array of light sources to provide a second image at the second viewing location.

11. The system of claim 10, wherein each collimated steerable light source is associated with a rendering engine.

12. The system of claim 10, wherein each collimated steerable light source is associated with an actuator.

13. The system of claim 10, wherein each collimated steerable light source is associated with a scanning mirror operatively coupled to the one or more actuators.

14. The system of claim 10, wherein each collimated steerable light source includes a red laser source, a green laser source and a blue laser source.

15. The system of claim 10, wherein each viewing location in the viewing area corresponds to a scan position of the array.

16. The system of claim 10, wherein the first and second viewing locations correspond to the left and right eyes of a viewer in the viewing area.

17. The system of claim 10, further comprising a camera.

18. The system of claim 10, further comprising an identity-confirming mechanism configured to identify a target viewer in the viewing area, wherein the identity-confirming mechanism includes a facial recognition processor that operates on images captured from the viewing area.

19. The system of claim 10, further comprising:
    an eye tracking processor configured to track at least one eye of a viewer in the viewing area to the second viewing location.

20. A computer program product comprising one or more non-transitory machine readable mediums encoded with instructions that when executed by one or more processors cause a process for displaying content to a viewing area to be carried out, the process comprising:
    receiving image data to be rendered by a direct view display, the direct view display including an array of collimated steerable light sources, each light source corresponding to a pixel of the display;
    generating control signals based on the image data, for driving the array of collimated light sources to provide a first image at a first viewing location in the viewing area;
    adjusting the array of collimated light sources to point to a second viewing location in the viewing area; and
    generating control signals based on the image data, for driving the array of light sources to provide a second image at the second viewing location.

21. The computer program product of claim 20, wherein adjusting the array of collimated light sources is carried out by one or more actuator devices included in the array.

22. The computer program product of claim 20, wherein adjusting the array of collimated light sources is carried out by one or more actuator devices included in the array, wherein each collimated steerable light source is associated with an actuator device operatively coupled with a scanning mirror.

23. The computer program product of claim 20, the process further comprising:
    projecting the first image to the first viewing location; and
    projecting the second image to the second viewing location.

24. The computer program product of claim 20, wherein the first and second viewing locations correspond to the left and right eyes of a viewer in the viewing area.

25. The computer program product of claim 24, the process further comprising at least one of:
    identifying the viewer; and
    prior to adjusting the array of collimated light sources to point to a second viewing location in the viewing area, tracking at least one eye of a viewer in the viewing area to the second viewing location.

* * * * *